United States Patent
Rickfjord et al.

(10) Patent No.: US 10,520,929 B2
(45) Date of Patent: Dec. 31, 2019

(54) TECHNIQUES FOR IMPLEMENTING UNIVERSAL COMMANDS IN A WELDING OR CUTTING SYSTEM

(71) Applicant: ESAB AB, Gothenburg (SE)

(72) Inventors: Stefan Rickfjord, Kungälv (SE); Jonatan Åkerlind, Hällingsjö (SE)

(73) Assignee: ESAB AB, Gotenburg (SE)

( * ) Notice: Subject to any disclaimer, the term of this patent is extended or adjusted under 35 U.S.C. 154(b) by 142 days.

(21) Appl. No.: 15/685,066

(22) Filed: Aug. 24, 2017

(65) Prior Publication Data

US 2018/0059652 A1 Mar. 1, 2018

Related U.S. Application Data

(60) Provisional application No. 62/382,055, filed on Aug. 31, 2016.

(51) Int. Cl.
| | | |
|---|---|---|
| *G05B 19/41* | (2006.01) | |
| *G05B 19/418* | (2006.01) | |
| *B23K 9/095* | (2006.01) | |
| *B23K 9/10* | (2006.01) | |

(52) U.S. Cl.
CPC ........ *G05B 19/4185* (2013.01); *B23K 9/0953* (2013.01); *B23K 9/1087* (2013.01); *G05B 2219/31129* (2013.01); *G05B 2219/45135* (2013.01)

(58) Field of Classification Search
None
See application file for complete search history.

(56) References Cited

U.S. PATENT DOCUMENTS

| | | | | |
|---|---|---|---|---|
| 8,892,947 B1 * | 11/2014 | Chopra | ............... | G06F 11/3688 714/32 |
| 8,934,994 B1 * | 1/2015 | Lee | ............... | G05B 19/4099 700/47 |
| 2005/0197115 A1 * | 9/2005 | Clark | ............... | B23K 9/0953 455/426.1 |
| 2006/0237409 A1 * | 10/2006 | Uecker | ............... | B23K 9/1068 219/130.5 |
| 2009/0122347 A1 | 5/2009 | Utsubo et al. | | |
| 2014/0042135 A1 * | 2/2014 | Daniel | ............... | B23K 9/10 219/130.5 |
| 2016/0152040 A1 | 6/2016 | Song et al. | | |

OTHER PUBLICATIONS

International Search Report and Written Opinion from PCT/IB2017/055159 dated Mar. 1, 2018.

* cited by examiner

*Primary Examiner* — Jason Lin
(74) *Attorney, Agent, or Firm* — Edell, Shapiro & Finnan, LLC

(57) ABSTRACT

Various embodiments are generally directed to techniques for implementing universal commands in a welding or cutting system. Techniques described herein may include a method including receiving, by a processor of a welding system, a command over a communication interface of the welding system. The command may be parsed into a command identifier. The command may be registered with a control module. The registered command may be assigned a sequence number. The command may be executed by the processor based upon the assigned sequence number. The results of the execution of the command may be stored into an output buffer. The results of the command may be sent via the communication interface to a node of the welding system.

16 Claims, 8 Drawing Sheets

Logic Flow 400

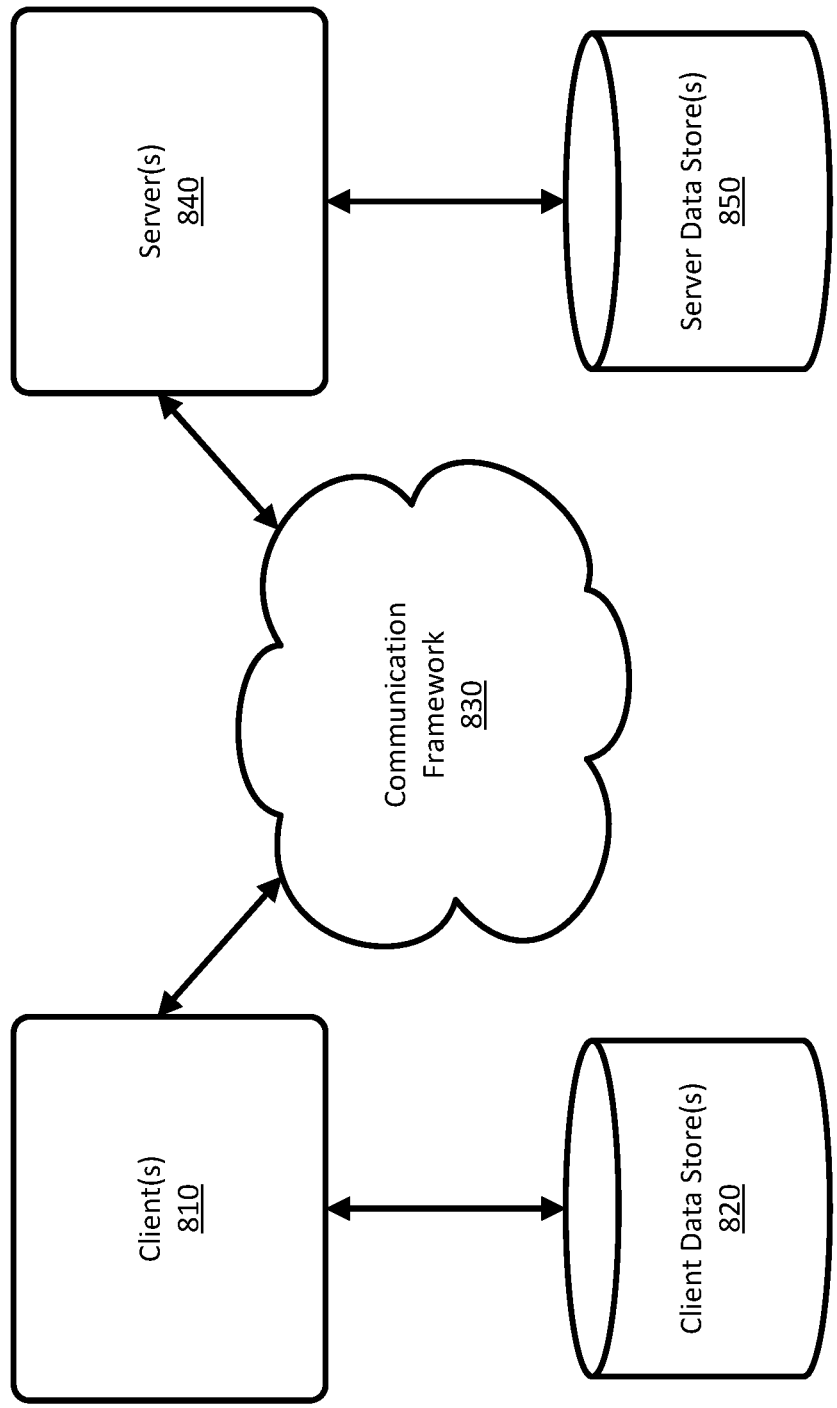

TECHNIQUES FOR IMPLEMENTING UNIVERSAL COMMANDS IN A WELDING OR CUTTING SYSTEM

CROSS-REFERENCE TO RELATED APPLICATIONS

This application claims the benefit of U.S. Provisional Patent Application No. 62/382,055, filed on Aug. 31, 2016, the disclosure of which is incorporated by reference herein in its entirety.

TECHNICAL FIELD

The present embodiments are related to techniques for implementing universal commands in a welding or cutting system.

BACKGROUND

Welding and cutting systems may include one or more application software modules, or other software libraries, with functions that may be performed on command. These functions may include configuration, upgrading, and maintenance of a welding and cutting system. In some welding and cutting systems, specific programming techniques, or particular protocols (e.g. CAN) may need to be used to interact with a welding or cutting system, or one or more nodes therein. Thus, specialized support services may be needed, rather than being readily available to novice end-users. Accordingly, it may be desirable to provide improved techniques for executing functions within a welding or cutting system.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for implementing universal commands in a welding or cutting system. Techniques described herein may include a method including receiving, by a processor of a welding system, a command over a communication interface of the welding system. The command may be parsed into a command identifier. The command may be registered with a control module. The registered command may be assigned a sequence number. The command may be executed by the processor based upon the assigned sequence number. The results of the execution of the command may be stored into an output buffer. The results of the command may be sent via the communication interface to a node of the welding system. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates an embodiment of a communications architecture.

DETAILED DESCRIPTION

Figure 1:
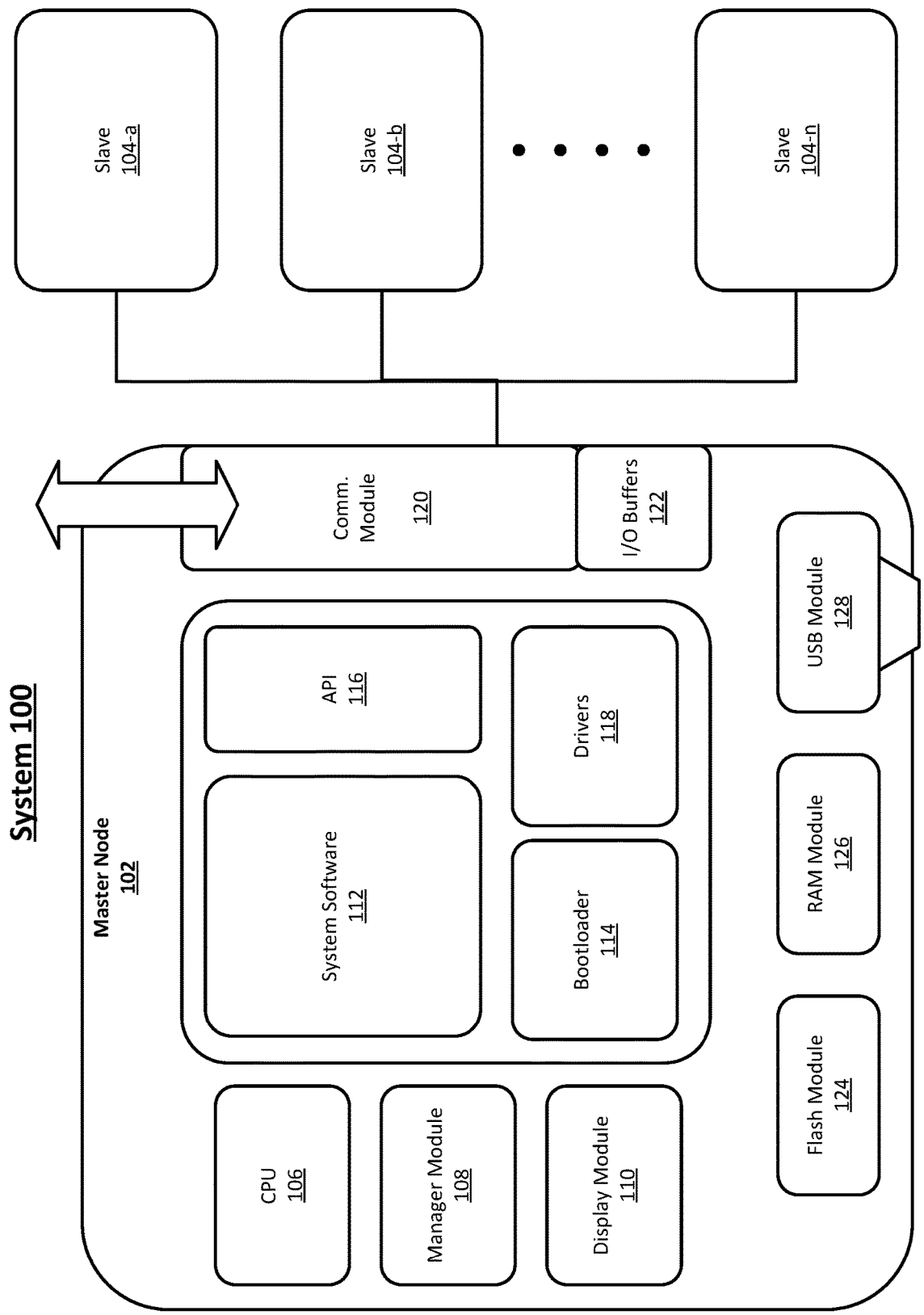
FIG. 1 illustrates an embodiment of a system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100, which may comprise a welding or cutting system in some embodiments. The system 100 may comprise one or more components configured to operate according to the embodiments and logic flows described herein. Although the system 100 shown in FIG. 1 has a limited number of elements in a certain topology, it may be appreciated that the system 100 may include more or less elements in alternate topologies as desired for a given implementation. The system 100 may include a master node 102, which may be generally operative to interact with one or more components or modules within system 100. Master node 102 may include one or more processing units, storage units, network interfaces, or other hardware and software elements, described in more detail below. Master node 102 may be one component of an overall welding or cutting system, such as a power source, and may be connected to other components, described herein.

In an embodiment, each component may comprise a device, such as a master node or slave node, comprising a network-connected storage device or multiple storage devices, such as one of the storage devices described in more detail herein. In an example, slave nodes 104-a through 104-n may include one or more devices used to access software or services provided by master node 102. For example, slave nodes 104 may include without limitation external user interface panels, internal user interface panels, wire feeders, power sources, or non-welding or cutting peripherals such as a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a wearable computing device such as a smart watch, a server, a server array or server farm, a web server, a network server, an Internet server, a work station, a mini-computer, a main-frame computer, a supercomputer, a network appliance, a web appliance, multiprocessor systems, processor-based systems, or any combination thereof.

In various embodiments, master node 102 and the other components of system 100 may comprise or implement multiple components or modules. As used herein the terms "component" and "module" are intended to refer to welding, cutting, and/or computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of non-transitory signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the components and modules of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In an embodiment, master node 102 may include CPU 106, which may comprise one or more microprocessor units, as described herein. CPU 106 may be configured to execute instructions including, but not limited to, system software 112, bootloader 114, Application Programming Interface (API) 116, and drivers 118. CPU 106 may be configured to execute instructions stored on, and access/store data from, one or more non-transitory computer-readable memory locations, such as flash module 124, RAM module 126, and Universal Serial Bus (USB) module 128. In some embodiments, a network communications interface may also be used by CPU 106 to access and execute instructions. Only certain software and memory locations have been illustrated within FIG. 1 for purposes of clarity, and it can be appreciated that more or less software and memory components may be used in certain embodiments, as described further herein. Moreover, FIG. 1 does not include an illustration of the welding and cutting components typically found within welding and cutting systems, however, it can be appreciated that system 100 may include any and all necessary components for a welding and cutting system.

Master node 102 may include manager module 108, which may comprise software, or a combination of software and hardware, to manage and configure the display of a user interface on display module 110. Manager module 108 may be configured to accept and communicate user input from display module 110 and other user input devices to CPU 106. Manager module 108 may receive user interface elements from other software components, such as system software 112 and bootloader 114, for example.

In some embodiments, master node 102 may include display module 110. Display module 110 may include one or more of the display technologies described herein. Further, in some embodiments, display module 110 may be external to master node 102, and connected through one or more communications techniques. Display module may be configured by manager module 108 to display a user interface comprising user interface elements and accept input from a user into the user interface. The user interface may, in some embodiments, display a choice for one of a plurality of application software modules stored within a memory of master node 102. In response to a selection of one of the application software modules by a user, manager module 108 may instruct the relevant component of master node 102 to execute the selected application software modules.

Display module 110 may comprise a touch screen display in some embodiments. Instead of, or in addition to, a touch screen, display module 110 may include or be coupled to one or more user interface elements, such as knobs, buttons, or combined knobs/buttons that may be used by a user of system 100 to view and select user interface options.

Master node 102 may include system software 112, which may be stored in one or more computer-readable storage media. System software 112 may be stored on one or more of flash module 124, RAM module 126, and USB module 128, or other internal memory, for example. System software 112 may be used to operate system 100, and may configure system 100 for welding and cutting operations. For example, system software 112 may include one or more application software modules, which may include operational instructions for welding or cutting processes, user interfaces for control and configuration of welding and cutting system, and all other necessary software instructions for operations of welding and cutting systems.

System software 112 may include one or more software libraries accessible to nodes within system 100, or external devices. As described further herein, universal commands may be communicated via communications module 120 and I/O buffers 122 to API module 116. These commands may then be parsed and executed, with results being delivered via communication module 120. Software libraries may include a set of routines or functions that may be performed by master node 102, or by one or more nodes of system 100 under control of master node 102. Various components of a welding or cutting system may be capable of performing different functions. For example, a wire feeder may be able to provide information on its operational status, or information on a configuration of wire being used. In another example, a power supply may be able to turn on, turn off, or provide information about its capabilities.

System software 112 may include one more specialized software modules for different aspects of a welding or cutting system, or for a particular node of a welding or cutting system. For example, software modules may exist for a cooler unit, remote control unit, wire feeder control unit, internal power supply, current regulation control, multi-voltage control unit, and/or power source unit. Each software module may include one or more available routines or functions which may be accessed using the universal commands described herein.

In an embodiment, master node 102 may include bootloader 114. Bootloader 114 may include a series of software instructions to start, or boot, system software 112. In addition, bootloader 114 may be configured to receive new software, save the received software in appropriate memory locations, and perform upgrades or replacement to existing system software 112. New software may be received either from an external storage device, such as USB module 128, or via a communications interface, such as communications module 120.

During a startup procedure, bootloader 114 may be executed first after a power on, or reset, instruction is received by system 100. Once bootloader 114 is initiated, it may begin by reading the value of a RAM variable stored within RAM module 126. The value of this variable may indicate whether the bootloader 114 should start system software 112 or stay in boot mode. The RAM variable may indicate that bootloader 114 should remain in boot mode, start system software 112, or remain in boot mode for a fixed period of time and wait for a programming request before starting system software 112. In some embodiments, the step of reading a flag may be overridden by one or more instructions from a communications interface, USB module, or the like.

An application programming interface (API) module 116 may be configured to receive and execute instructions received via communications module 120. Communication module may include one or more of the communications interfaces described herein, and may include one or more storage interfaces, such as USB, or human-machine interfaces, such as panels, SSH, or telnet. API module 116 may comprise one or more APIs, which are interfaces for commands that software can use to access an underlying software library. In an embodiment, system software 112 may be available as a software library that may be accessed via API module 116. Like a user interface allows a user to access software on a computer, an API may provide software with access to a software library using a set of universal commands. Using one or more predefined commands, software running outside of master node 102 may request that certain software routines within a software library use API module 120.

Commands issued to API module 116 may be of a particular format, which may be universally understood to users and other nodes. For example, rather than being aware of specific communications protocols associated with a particular node, a universal interface may be provided such that novice users and devices may be able to access software functions within master node 102. Users, mobile devices, and test equipment may communicate with master 102 via API module 116 using predefined API commands and variables. In one example, a fan module may be issued a command using the syntax ("fan", 0x013) and a subcommand ("reset", 0x03). This series of commands may access the fan module and reset it.

In an embodiment, each command may be associated with a particular class or component, and may be uniquely identified by a command identifier. Further, as discussed above, the format of each command may be set such that a particular string of text may be used to initiate and execute the command using a command line tool, such as telnet or SSH. When a command is communicated to master node 102 via communication module 120, it may be parsed by API module 116, identified using its unique identifier, and assigned a sequence number for execution. The sequence number may be issued so that a command must wait in line for all other previous commands to execute, or for other commands issued to the same component to execute. In some embodiments, commands may be executed by one or more components in parallel. When an available time slot for a particular component is available, API module 116 may execute the command, receive results, place results into an output buffer, and communicate results via communications module 120 to the appropriate requester.

In an exemplary embodiment, commands may be sent using a variety of formats, such as via text (from a console, UI, text file, telnet, or SSH, for example) or binary (CAN, Ethernet, binary file, for example), and API module 116 may parse the commands and issue them appropriately. Likewise, API module 116 may be configured to deliver results of executed commands via the same format the command was sent in. In this manner, a wide variety of devices may be able to issue universal commands to one or more nodes within a system 100.

API module 120 may utilize one or more I/O buffers 122, which may include software and hardware for storing commands received via communications module 120 and responses from one or more components of master node 102. In some embodiments, many requests may be made for information, via API module 120. These requests may be stored in an input buffer and executed in order based on time or efficiency, or out of order based upon assigned priority levels. Since certain communications protocols may only communicate information in a serial manner, one or more output buffers may store and queue output from master node 102.

Communications module 120 may include one or more communications interfaces for master node 102. Master node 102 may communicate using a plurality of electrical interfaces and protocols such as CAN, CAN2, RS-232, USB, Wi-Fi, Bluetooth, Ethernet, LoRa, EtherCAT, CANOpen, and/or any of the known electrical interfaces and communications protocols described herein. Communications module 120 may use drivers 118, which may include one or more software applications implementing various communications protocols, to implement each communications interface within master node 102.

Figure 2:
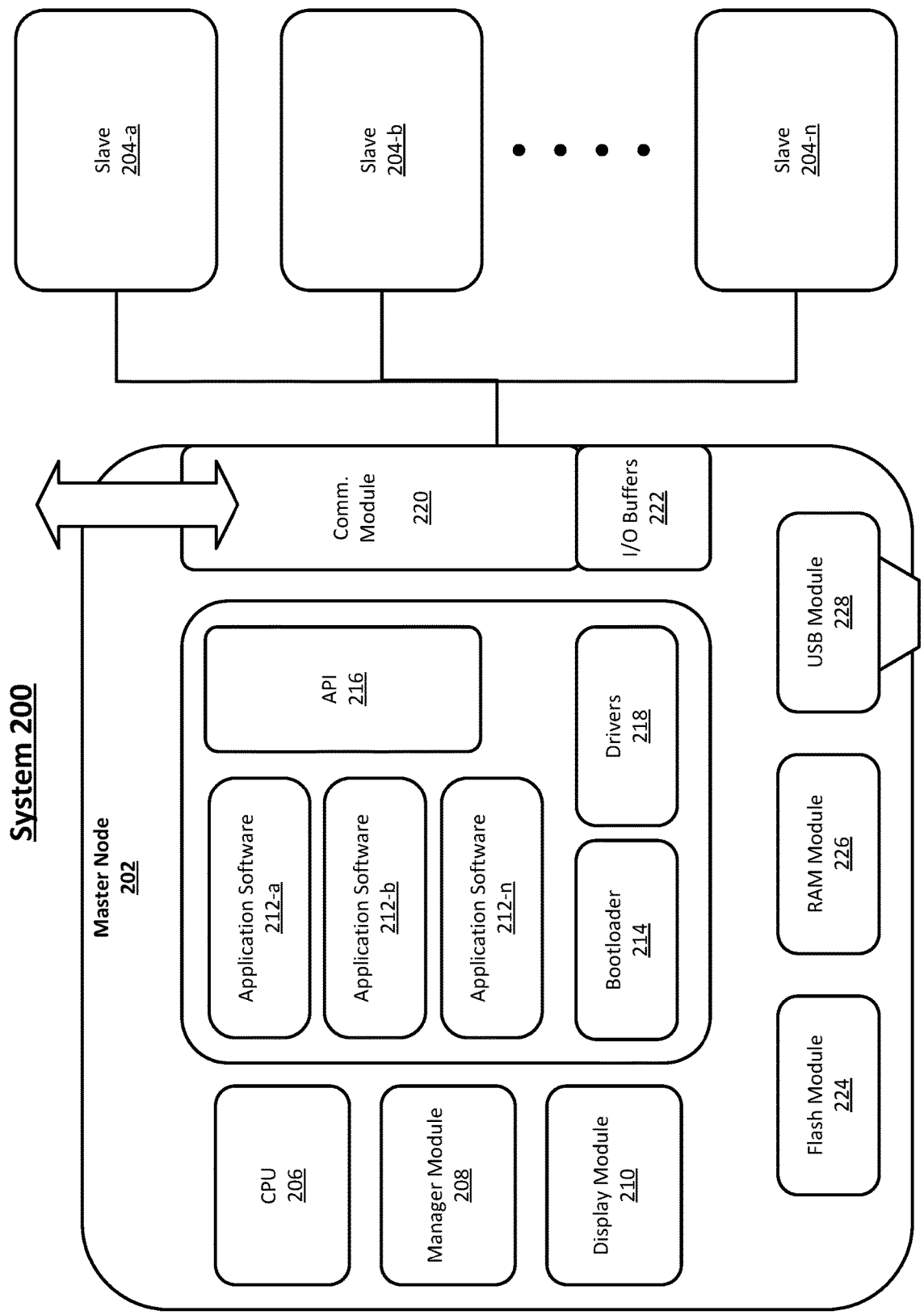
FIG. 2 illustrates an embodiment of a system.

FIG. 2 illustrates a block diagram for a system 200, which may comprise a welding or cutting system in some embodiments. The system 200 may comprise one or more components configured to operate according to the embodiments and logic flows described herein. FIG. 2 includes many components similar to those described with respect to FIG. 1, and components corresponding to the description of FIG. 1 have been like-numbered. Thus, CPU 206 corresponds to CPU 106, manager module 208 corresponds to manager module 108, and I/O Buffers 222 corresponds to I/O Buffers 222. FIG. 2 illustrates an embodiment in which there are multiple application software modules 212-*a* through 212-*n* installed within master node 202. More or less application software modules may be present within a particular embodiment. Further, as described further, application software modules may comprise different versions of the same software, software with different functionality, upgraded versions of software for master node 202 or slave nodes 204 (e.g., 204-*a* through 204-*n*), and/or configuration software for a welding or cutting system. While only showed in detail with respect to a master node, slave nodes may also include more than one application software module, and may incorporate the techniques described herein with respect to a master node, including one or more hardware and software components of the master node.

In an embodiment, master node 202 may include more than one application software module 212. Each application software module 212 may include instructions for the operation and/or configuration of a welding or cutting system. A first software application module may include a first version of software for a welding and cutting system. A second software application module may include a second version of the same software. In some embodiments, a software application module may include software for one or more slave nodes in a welding or cutting system. In an embodiment, a first software application module may include a first set of functionality and a second software application module may include a second set of functionality. The first set of functionality may differ from the second set of functionality. Still, in another embodiment, a software application module may include an upgrade to existing software application modules. The embodiments are not limited in this context.

Each software application module may include one or more software functions that are accessible to master node 202, or outside nodes, via API module 216. As described above, commands may be issued via communication module 220 to API module 216, and executed. In system 200, a plurality of application software modules are present, and each may include unique functions available for access by universal commands. Further, one may wish to access commands from a previous, or new version of software, and may do so by using a unique identifier for a command. In this manner, testing may be performed using functions across various application software modules.

During a startup procedure, bootloader 214 may be executed first after a power on, or reset, instruction is received by system 200. Once bootloader 214 is initiated, it may begin by reading the value of a RAM variable stored within RAM module 226 (if no overriding of the flag is initiated, as described above). The value of this variable may indicate whether the bootloader 214 should start executing one of application software modules 212 or stay in boot mode. The RAM variable may indicate that bootloader 214 should remain in boot mode, start application software modules 212, or remain in boot mode for a fix period of time and wait for a programming request before executing one of software application modules 212. Further, the RAM variable may indicate to bootloader 214 whether more than one application software module 212 is present on master node 102. When only a single application software module is present, that module may be the default application software module to execute. However, when more than one application software module is present, bootloader 214 may, in some embodiments, present a choice of available software application modules to a user of system 200 using display module 210.

In an embodiment, bootloader 214 may use one or more flags stored in memory to determine which of a plurality of application software modules 212 to load upon startup. In some embodiments, a user may select a default application software module that is saved for future bootloading. In this situation, bootloader 214 may always load the default application software module, unless another user input is given, such as pressing a button, pressing a button for a predetermined amount of time during startup, selecting an option on a user interface, or other indication that the default bootloading should be modified at that time. In some embodiments, a bootloading module may receive a remote indication that a software application module other than default should be chosen, or some other action should be taken, for instance that the bootloader should remain in boot mode. In an example, an instruction may be given by software loaded onto a USB drive and inserted into USB module 228. In another example, an instruction may be communicated via one or more communication interfaces of communications module 220.

In some embodiments, the ability to store multiple application software modules and select from among them at startup may provide for increased efficiency in upgrading software among one or more nodes within a welding and cutting system. For example, in a multi-node system, a master node 202 may include a master bootloader 214, and slave nodes 204 may include slave bootloaders (not shown). A master node 202 may monitor and control slave nodes, including monitoring and control of each slave bootloader. In an embodiment, a slave node 204 may wait for a "start application" command from a master node before a slave bootloader will exit boot mode. This may allow for a simplified upgrade of one or more slave nodes to new application software. For example, during a mass upgrade procedure, pausing all slave nodes in boot mode upon startup until they receive an indication otherwise may prevent communications and other operations within a welding or cutting system during the upgrade process.

In an embodiment, a slave node 204 may communicate to master node 202 via communications module 220 that the slave node is missing application software, or existing application software has been damaged or corrupted. The master node 202 may then communicate a new or replacement version of an application software module to the slave node so the entire welding and cutting system may continue to operate.

Figure 3:
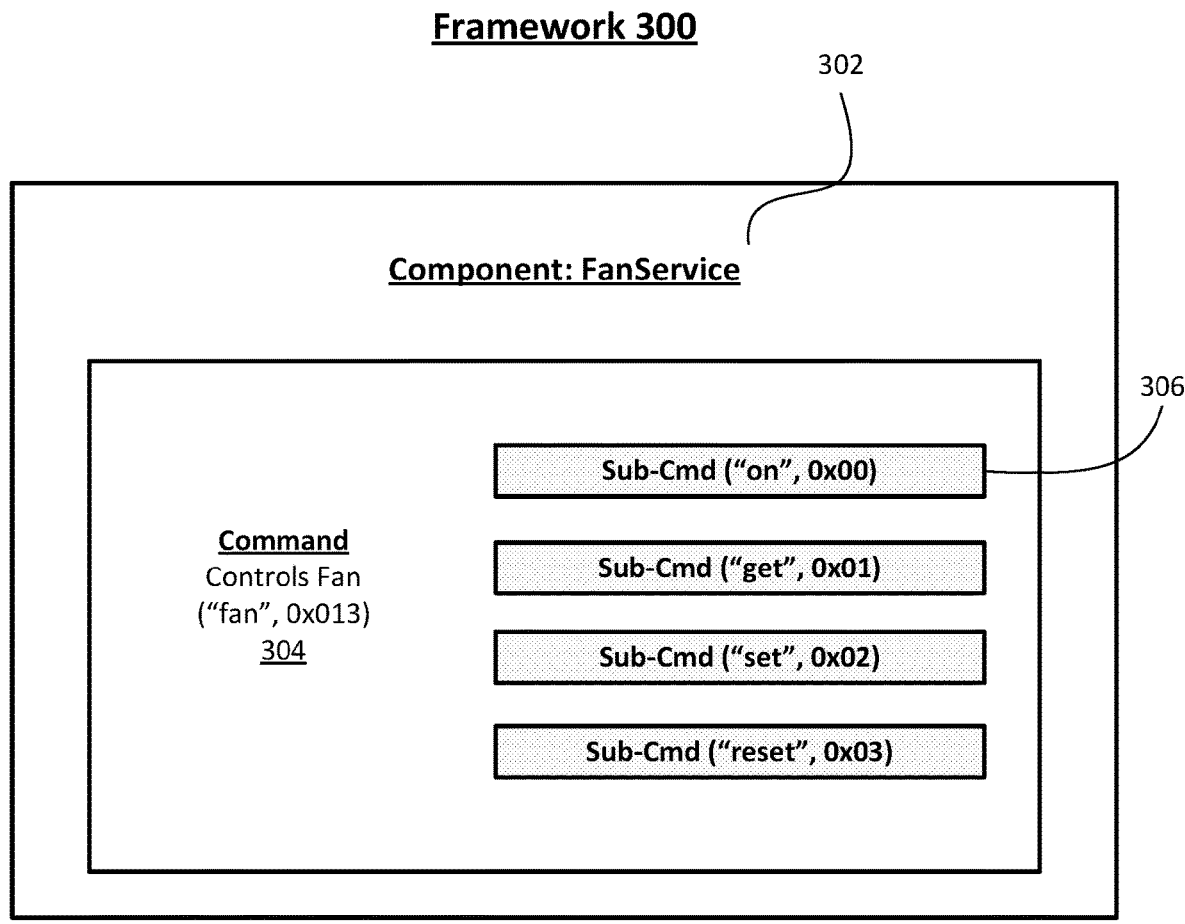
FIG. 3 illustrates a command framework according to an embodiment.

FIG. 3 illustrates a command framework 300 according to an embodiment. Command framework 300 may illustrate an exemplary structure for commands issued to a node within a welding or cutting system. However, it can be appreciated that other architectures for a command may be used, with more or less variables, or different syntax, to achieve results consistent with the embodiments described herein. Element 302 identifies the component for which a command may be associated with and issued to. Here, element 302 identifies a FanService component, which may be available within an application software module of a node. Command 304 may include a syntax that can be universal and agnostic to communication methods and protocols. For example, whether sent in binary, text, or over one of various communication protocols, an API module of a node may receive a command 304 and parse it into the proper command for the associated module. In this manner, communication and execution of functions within a welding or cutting system may be streamlined and simplified for a wide variety of users and devices. In addition to command 304, subcommands 306 may also be available. Subcommands may optionally be used to perform further functions on an associated component.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium or a computer-program product. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, text, or scripts, and the like. The embodiments are not limited in this context.

Figure 4:
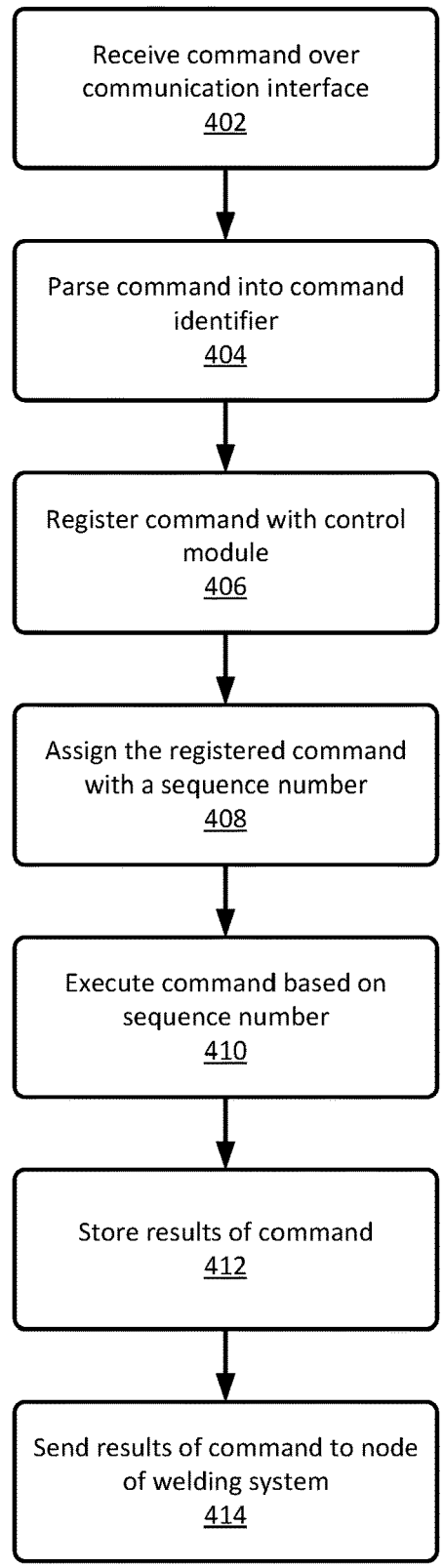
FIG. 4 illustrates a logic flow according to an embodiment.

FIG. 4 illustrates one embodiment of a logic flow 400. The logic flow 400 may be representative of some or all of the operations executed by one or more embodiments described herein. For instance, the logic flow 400 may be representative of some or all of the operations executed by system 100 or system 200, and the components and modules included therein. Logic flow 400 may represent a set or subset of functions performed by a bootloader module of a node of a welding or cutting system.

At 402, a processor may receive a command over a communication interface of a welding system. Any communication described herein may be used, and the command may be in a format consistent with FIG. 3, described above. Commands may be received via various communication interfaces including one or more storages interfaces, such as USB, or human-machine interfaces, such as panels, SSH, or telnet. Received commands may be initially placed into an input buffer for processing by one or more components of a node. Whether handled serially or in parallel, there may be a need to buffer commands being sent to the system.

At 404, when a time slot has become available for a particular command, the command may be parsed into a command identifier, which may be unique in some embodiments. The command identifier may identify to an API module the proper component and/or application software module that the command is intended for. Once identified, an API module may register the command at 406 for processing and execution by the identified component.

At 408, the registered command may be assigned a sequence number, which may be assigned system-wide, or on a component-by-component basis. When the appropriate component is available to execute a command, the command may be executed at 410.

At 412, the results of the execution of the command may be stored into an output buffer to await communication to the calling node or system, and at 414, the output may be sent via a communication interface to the calling node or system.

Figure 5:
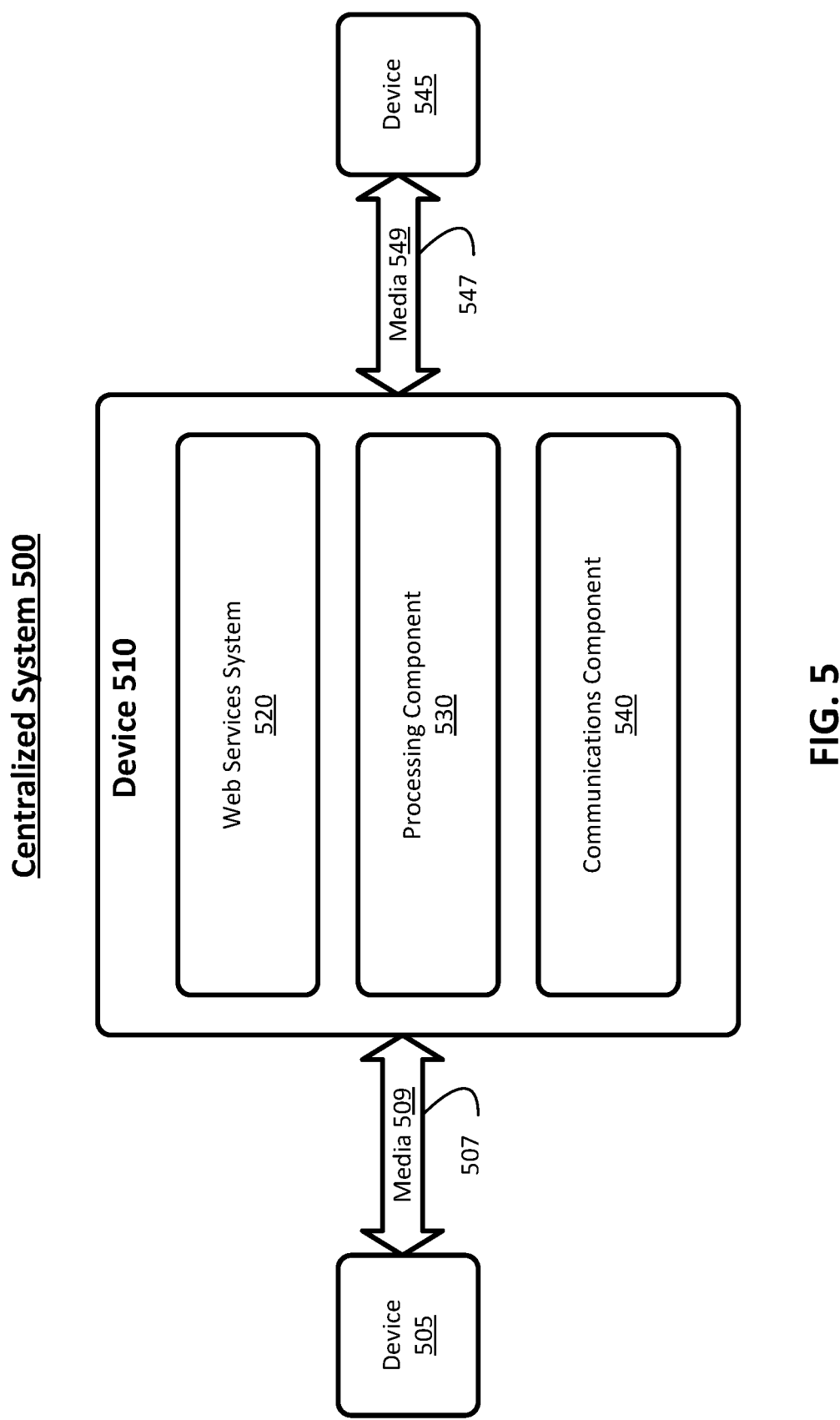
FIG. 5 illustrates an embodiment of a centralized system according to an embodiment.

FIG. 5 illustrates a block diagram of a centralized system 500. The centralized system 500 may implement some or all of the structure and/or operations for the web services system 520 in a single computing entity, such as entirely within a single device 510. By way of example, and not limitation, one or more of the embodiments described herein may use the components and techniques described with respect to FIG. 5 for centralized and/or distributed operations. In some embodiments, a welding or cutting system may utilize one or more of the techniques described with respect to FIG. 5.

The device 510 may comprise any electronic device capable of receiving, processing, and sending information for the web services system 520. Examples of an electronic device may include without limitation a welding or cutting machine, computer, a personal computer (PC), a desktop computer, a laptop computer, a notebook computer, a net-book computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or combination thereof. The embodiments are not limited in this context.

The device 510 may execute processing operations or logic for the web services system 520 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 510 may execute communications operations or logic for the web services system 520 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 509, 549 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 510 may communicate with other devices 505, 545 over a communications media 509, 549, respectively, using communications signals 507, 547, respectively, via the communications component 540. The devices 505, 545, may be internal or external to the device 510 as desired for a given implementation. Examples of devices 505, 545 may include, but are not limited to, a mobile device, a personal digital assistant (PDA), a mobile computing device, a smart phone, a telephone, a digital telephone, a cellular telephone, ebook readers, a handset, a one-way pager, a two-way pager, a messaging device, consumer electronics, programmable consumer electronics, game devices, television, digital television, or set top box.

For example, device 505 may correspond to a client device such as a phone used by a user. Signals 507 sent over media 509 may therefore comprise communication between the phone and the web services system 520 in which the phone transmits a request and receives a web page in response.

Device 545 may correspond to a second user device used by a different user from the first user, described above. In one embodiment, device 545 may submit information to the web services system 520 using signals 547 sent over media 549 to construct an invitation to the first user to join the services offered by web services system 520. For example, if web services system 520 comprises a social networking service, the information sent as signals 547 may include a name and contact information for the first user, the contact information including phone number or other information used later by the web services system 520 to recognize an incoming request from the user. In other embodiments, device 545 may correspond to a device used by a different user that is a friend of the first user on a social networking service, the signals 547 including status information, news, images, or other social-networking information that is eventually transmitted to device 505 for viewing by the first user as part of the social networking functionality of the web services system 520.

Figure 6:
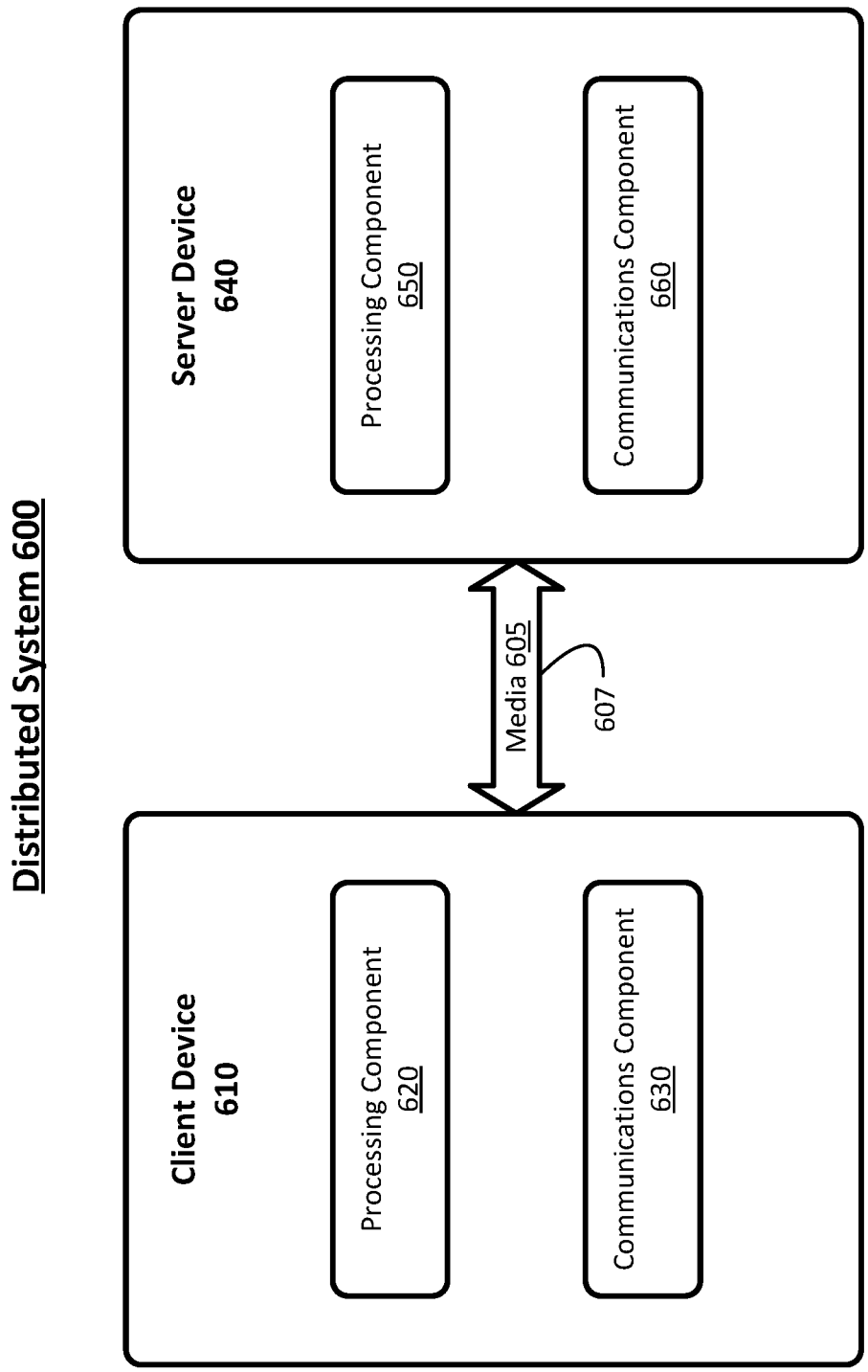
FIG. 6 illustrates an embodiment of a distributed system according to an embodiment.

FIG. 6 illustrates a block diagram of a distributed system 600. The distributed system 600 may distribute portions of the structure and/or operations for the disclosed embodiments across multiple computing entities, such as two or more nodes of a welding or cutting system. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and a server device 640. In general, the client device 610 and the server device 640 may be the same or similar to device 510 as described with reference to FIG. 5. For instance, the client device 610 and the server device 640 may each comprise a processing component 620, 650 and a communications component 630, 660 which are the same or similar to the processing component 530 and the communications component 540, respectively, as described with reference to FIG. 5. In another example, the devices 610 and 640 may communicate over a communications media 605 using media 605 via signals 607.

The client device 610 may comprise or employ one or more client programs that operate to perform various methodologies in accordance with the described embodiments. In one embodiment, for example, the client device 610 may implement some steps described with respect to client devices described in the preceding figures.

Figure 7:
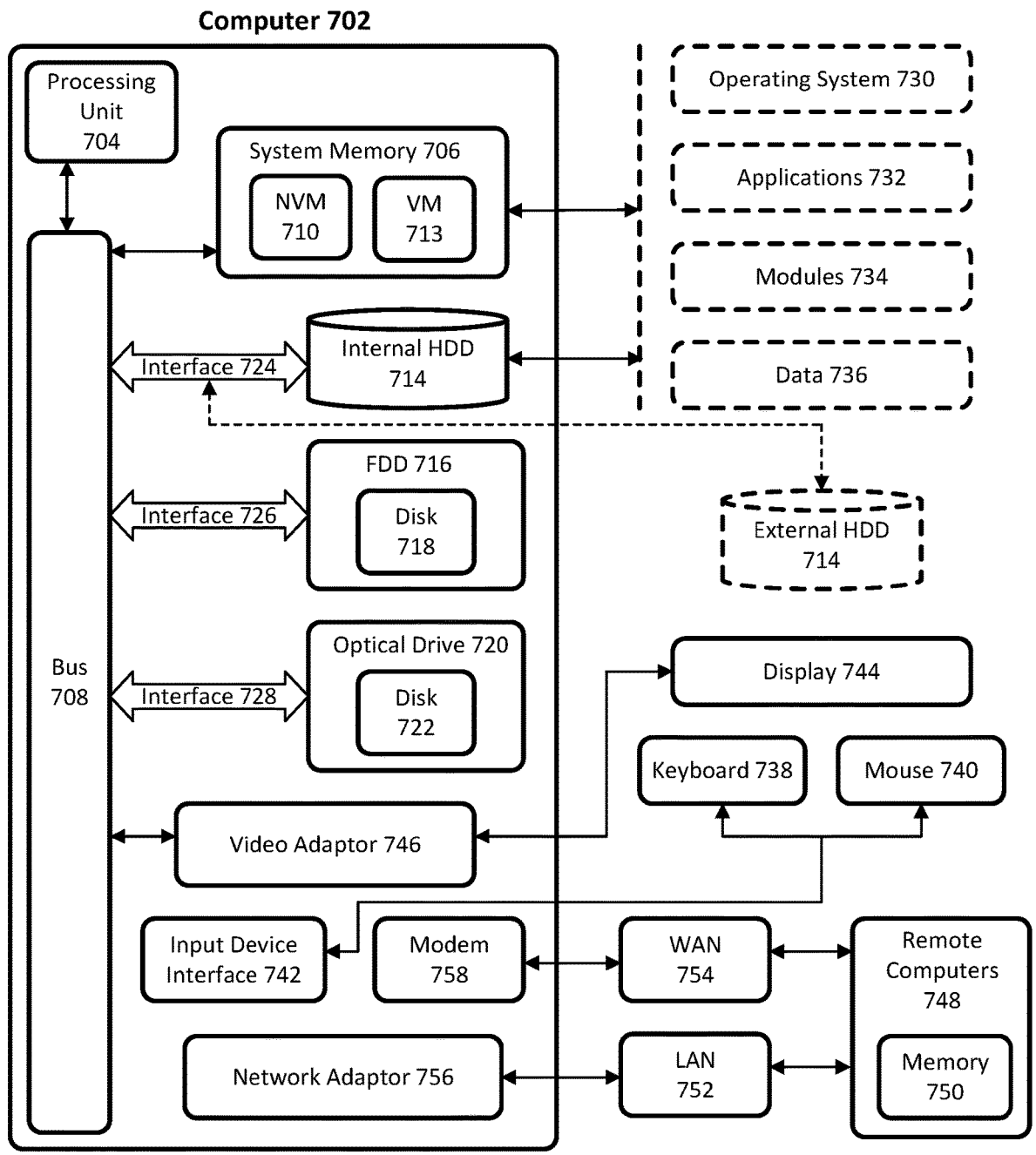
FIG. 7 illustrates an embodiment of a computing architecture.

The server device 640 may comprise or employ one or more server programs that operate to perform various methodologies in accordance with the described embodiments. In one embodiment, for example, the server device 640 may implement some steps described with respect to server devices described in the preceding figures FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described herein, such as a welding or cutting system and/or one or more nodes therein. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structures that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 713. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM, DVD, or Blu-ray). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 713, including an operating system 730, one or more application programs 732, other program modules 734, and program data 736. In one embodiment, the one or more application programs 732, other program modules 734, and program data 736 can include, for example, the various applications and/or components to implement the disclosed embodiments.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, knobs, buttons, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A display 744 is also connected to the system bus 708 via an interface, such as a video adaptor 746. The display 744 may be internal or external to the computer 702. In addition to the display 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 8 illustrates a block diagram of an exemplary communications architecture 1000 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 810 and servers 840. The clients 810 may implement the client device 810, for example. The servers 840 may implement the server device 840, for example. The clients 810 and the servers 840 are operatively connected to one or more respective client data stores 820 and server data stores 850 that can be employed to store information local to the respective clients 810 and servers 840, such as cookies and/or associated contextual information.

The clients 810 and the servers 840 may communicate information between each other using a communication framework 830. The communications framework 830 may implement any well-known communications techniques and protocols. The communications framework 830 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 830 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 810 and the servers 840. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes example embodiments of the present invention. It is, of course, not possible to describe every conceivable combination of components and/or methodologies, but one of ordinary skill in the art may recognize that many further combinations and permutations are possible.

The invention claimed is:

1. A method, comprising:
receiving, by a processor of a welding system, a command over a communication interface of the welding system;
parsing, by the processor, the command into a command identifier;
registering, by the processor, the command with a control module;
assigning, by the processor, the registered command with a sequence number;
executing, by the processor, the command based upon the assigned sequence number;
storing, by the processor, the results of the command into an output buffer; and
sending, by the processor, the results of the command via the communication interface to a node of the welding system;
wherein the command is in a format that is specific to a particular component of the welding system and identifies the component.

2. The method of claim 1, wherein the command is received from a user interface of a node connected to the welding system.

3. The method of claim 1, wherein the command is received from a testing system.

4. The method of claim 1, wherein the command additionally comprises one or more subcommands to perform additional functions on the component.

5. The method of claim 1, wherein the command is parsed into a command identifier, when a time slot is available for a particular command.

6. The method of claim 1, wherein the command identifier is unique.

7. The method of claim 1, wherein the command identifier identifies to an API module a component and/or the application software module that the command is intended for.

8. The method of claim 1, wherein the sequence number is assigned on a system-wide basis.

9. The method of claim 1, wherein the sequence number is assigned on a component-by-component basis.

10. A welding system comprising at least one processor and at least one network interface, wherein the at least one processor is configured to:
receive a command over a communication interface of a welding system;
parse the command into a command identifier;
register the command with a control module;
assign the registered command with a sequence number;
execute the command based upon the assigned sequence number;
store the results of the command into an output buffer; and
send the results of the command via the communication interface to a node of the welding system;
wherein the command is in a format that is specific to a particular component and identifies the component.

11. The welding system of claim 10, wherein the command is received from a user interface of a node connected to the welding system.

12. The welding system of claim 10, wherein the command is received from a testing system.

13. The welding system of claim 10, wherein the command additionally comprises one or more subcommands to perform additional functions on the component.

14. The welding system of claim 10, wherein the command identifier identifies to an API module the component and/or the application software module that the command is intended for.

15. An article including a computer program product embodied on a non-transitory computer readable storage media storing instructions, that, when executed by one or more processors, performs the steps of:
receiving a command over a communication interface of a welding system;

parsing the command into a command identifier;

registering the command with a control module;

assigning the registered command with a sequence number;

executing the command based upon the assigned sequence number;

storing the results of the command into an output buffer; and sending the results of the command via the communication interface to a node of the welding system;

wherein the command is in a format that is specific to a particular component and identifies the component.

16. The computer program product of claim 15, wherein the command additionally comprises one or more subcommands to perform additional functions on the component.

* * * * *